US007162126B2

(12) United States Patent
Takagi et al.

(10) Patent No.: US 7,162,126 B2
(45) Date of Patent: Jan. 9, 2007

(54) OPTICAL MODULE HAVING A SEMICONDUCTOR OPTICAL DEVICE MOUNTED ON A BARED CLADDING OF AN OPTICAL FIBER

(75) Inventors: Toshio Takagi, Yokohama (JP); Kenichiro Ohtsuka, Yokohama (JP); Toshifumi Hosoya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 77 days.

(21) Appl. No.: 10/927,503

(22) Filed: Aug. 27, 2004

(65) Prior Publication Data

US 2005/0089279 A1   Apr. 28, 2005

(30) Foreign Application Priority Data

Aug. 28, 2003  (JP)  ............................. 2003-305346

(51) Int. Cl.
*G02B 6/30*     (2006.01)
*G02B 6/42*     (2006.01)
*G02B 6/36*     (2006.01)

(52) U.S. Cl. ........................... 385/49; 385/14; 385/88; 385/90; 385/92

(58) Field of Classification Search ................. 385/88, 385/89–90, 92, 14, 91, 49, 39
See application file for complete search history.

(56) References Cited

U.S. PATENT DOCUMENTS

| 6,217,231 B1 | 4/2001 | Mesaki et al. |
| 6,568,862 B1 * | 5/2003 | Schulz et al. ................. 385/88 |
| 2002/0102069 A1 | 8/2002 | Nobuhara et al. |

FOREIGN PATENT DOCUMENTS

JP   2000-171668   6/2000

* cited by examiner

*Primary Examiner*—Frank G. Font
*Assistant Examiner*—Michael P. Mooney
(74) *Attorney, Agent, or Firm*—McDermott Will & Emery LLP

(57) ABSTRACT

The present invention is to provide an optical module in which factors influencing the optical coupling between the semiconductor optical device and the optical fiber may be reduced. The optical module of the present invention includes a ferrule having first and second regions arranged in this order, and an optical fiber secured in the center of the ferrule. The second region of the ferrule provides an end surface of the ferrule, where the tip of the core is exposed thereto, and a mounting surface where the semiconductor optical device is mounted thereon to optically couple with the core of the optical fiber.

15 Claims, 13 Drawing Sheets

OPTICAL MODULE HAVING A SEMICONDUCTOR OPTICAL DEVICE MOUNTED ON A BARED CLADDING OF AN OPTICAL FIBER

BACKGROUND OF THE INVENTION

1. Field of the Invention

The present invention relates to an optical module using a bared cladding of an optical fiber, where a semiconductor optical device is mounted thereon.

2. Related Prior Art

A silicon substrate having a V-groove is typically used for an optical module that an optical fiber and a semiconductor laser diode are optically coupled with a butt joint. Japanese patent published as 2000-171668 has disclosed such optical module having the silicon substrate with the V-groove. The optical fiber embedded within the V-groove is butted against a wall of the groove and is coupled with the laser diode mounted on a primary surface of the silicon substrate.

In the case that the silicon substrate is used to optically couple the laser diode with the optical fiber, the laser diode and the optical fiber must be aligned with the silicon substrate. The optical fiber is easily aligned with the substrate by embedding the fiber into the V-groove. However, the alignment of the laser diode with the substrate is not as simple as that of the optical fiber. Alignment mark is formed by the etching of the substrate, or is deposited with a patterned metal film on the substrate. The laser diode is aligned with the substrate by using thus formed alignment mark.

However, such configuration using the V-groove or the alignment mark leads the scattering in the optical coupling efficiency by two step alignment, namely, between the laser diode and the substrate and between the optical fiber and the substrate.

SUMMARY OF THE INVENTION

Therefore, one object of the present invention is to provide an optical module in which factors influencing the scattering of the optical coupling efficiency between the semiconductor optical device and the optical fiber may be reduced.

According to one aspect of the present invention, an optical module that includes a semiconductor optical device, an optical fiber and a ferrule is provided. The optical fiber has an optical axis, and includes a core and a cladding. The ferrule may include a bore into which the optical fiber is inserted. The ferrule may be divided into two regions, i.e., first and second regions along the optical axis of the optical fiber. The first region holds the whole portion, the core and the cladding, of the optical fiber, while the second region holds only a portion of the cladding by removing the portion of the cladding and the core. Accordingly, an end surface is formed at the interface between the first and second regions to expose the core of the optical fiber, and a section of the cladding is formed along the optical axis in the second region. The semiconductor optical device is mounted on the section of the cladding in the second region, thereby optically coupling the device with the core exposed in the end surface of the first region.

The core of the optical fiber of the invention may have a single mode characteristic for the wavelength band of 1.3 µm and 1.56 µm. Further, the core may convert its mode field diameter at the end surface, about 6 µm in preferable.

The end surface of the first region may make an obtuse angle to the section of the cladding appeared in the second region where the semiconductor optical device is mounted thereon. Preferably, the obtuse angle may be from 95° to 98°. Further, the end surface of the first region may make an acute angle to a facet of the semiconductor optical device that faces the end surface. Preferably, the acute angle may be from 5° to 8°.

The ferrule of the present invention may further include a third region provided so as to sandwich the second region with the first region. The third region provides a mounting surface by removing a portion of the ferrule, the core and the cladding to form a step between the second region. The module may further include a photodiode mounted on the mounting surface of the third region. The photodiode may receive light emitted from the semiconductor optical device mounted on the section in the second region. The photodiode may have thickness thinner than the step formed between second and third regions, and may be mounted on an edge adjacent to the third region. The photodiode and the ferrule thus configured and arranged may enhance light receiving efficiency.

Another aspect of the present invention relates to an optical transmitting module. The transmitting module includes a laser diode, a photodiode, an optical fiber, a ferrule, and a carrier. The optical fiber includes first to third portions, while the ferrule includes first to third regions, each corresponding to first to third portions of the optical fiber. The first and third portions of the optical fiber provide a core and a cladding, while the second portion thereof provides only a portion of the cladding. The first and third regions of the ferrule hold the first and third portions of the optical fiber, respectively. Accordingly, the first region provides a first end surface to expose an end of the core of the first portion of the optical fiber, and the third region provides a second end surface to expose an end of the core of the third portion of the optical fiber. Further, the second region holds the second portion of the optical fiber to expose a section of the cladding of the second portion of the optical fiber. The carrier mounts the ferrule and the photodiode thereon. In this configuration of the optical transmitting module, the laser diode is mounted on the section of the cladding exposed in the second region. Accordingly, a first facet of the laser diode optically couples with the core of the first portion of the optical fiber exposed at the first end surface, while a second facet of the laser diode optically couples with the core of the third portion of the optical fiber exposed at the second end surface.

The carrier may be an L-shaped carrier that includes first and second portions. The first portion may provide a first depression into which the ferrule is held. A width of the first depression may be substantially equal to, or slightly smaller than, the width of the outer diameter of the ferrule. The second portion of the L-shaped carrier may provide a second depression continuous and narrower in width to the first depression to form a step between the first depression. The photodiode may be mounted on the bottom of the second depression. Accordingly, an end of the ferrule opposing to the second end surface of the third region thereof butts against the step between the first and second depressions. Thus, the photodiode may optically couple with the laser diode mounted on the section appeared in the second region of the ferrule.

DETAILED DESCRIPTION OF PREFERRED EMBODIMENTS

Next, preferred embodiments of the present invention will be described as referring to accompany drawings. In drawings and specifications, same elements will be referred by the same symbols or numerals without overlapping explanations. The dimensions in drawings do not always reflect their practical dimensions.

First Embodiment

Figure 1:
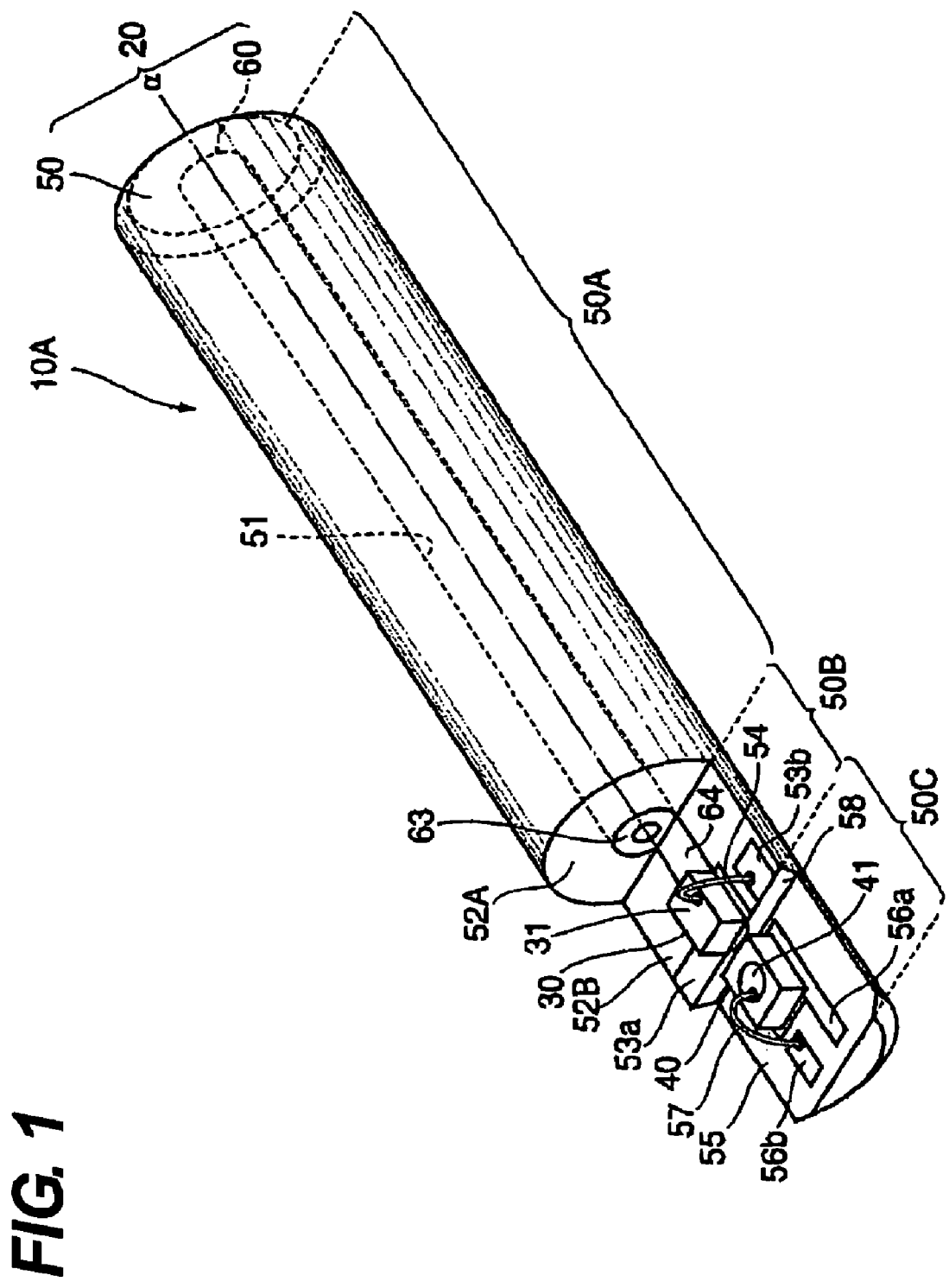
FIG. 1 is a perspective view showing the optical module according to the first embodiment of the present invention.

FIG. 1 is a perspective view showing an optical module 10A according to the present invention. The optical module 10A includes an optical fiber 60, a ferrule 50, a light-emitting device 30, and a light-receiving device 40.

Figure 2:
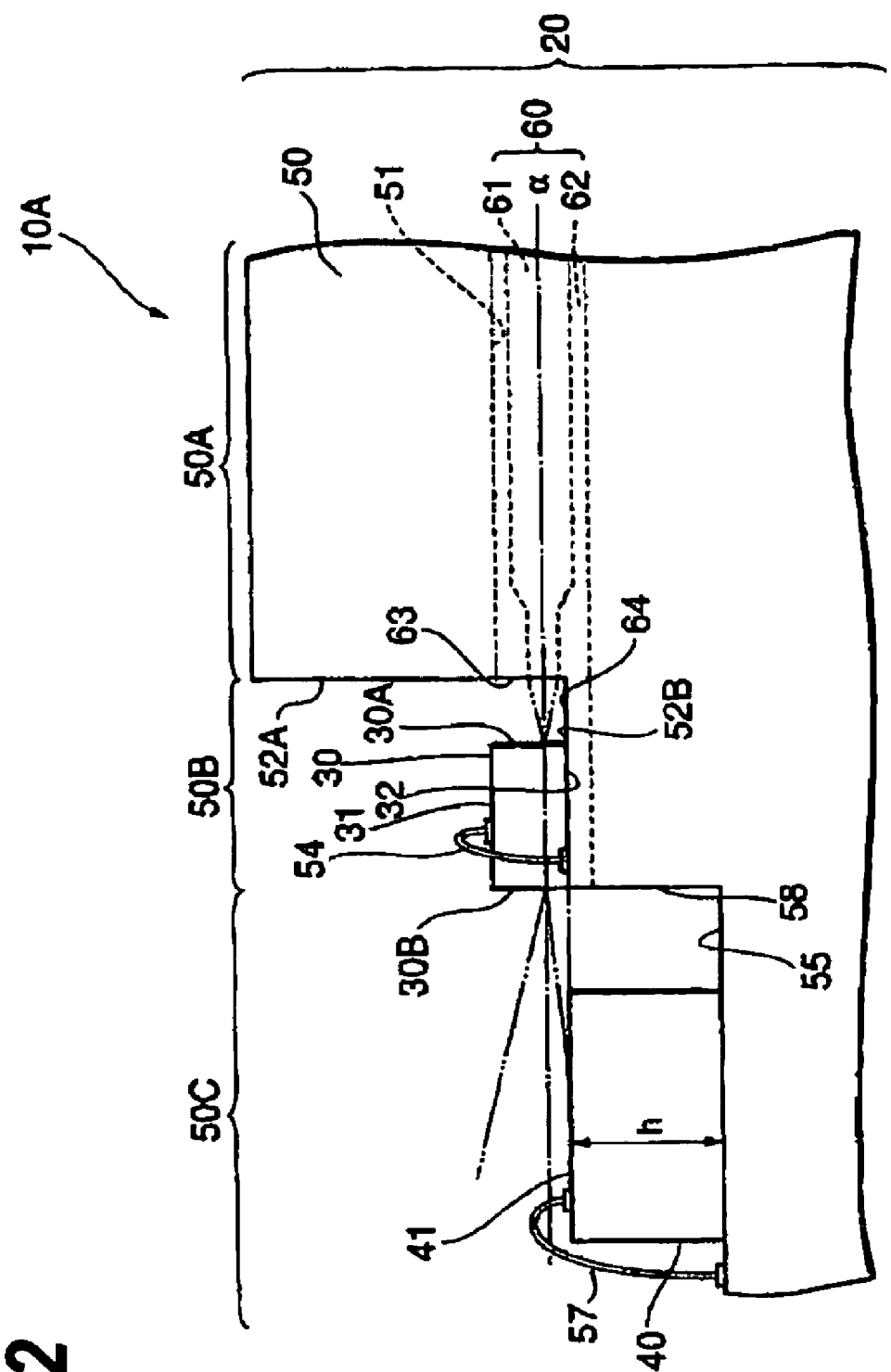
FIG. 2 is a magnified side view of the optical module shown in FIG. 1.

As shown in FIG. 2, the optical fiber 60 includes a core 61 and a cladding 62 surrounding the core 61, and, from another aspect, the ferrule 50 includes a first region 50A and a second region 50B along the axis α. The optical fiber 60 is preferably a single mode fiber for a specific wavelength such as 1.3 μm band or 1.55 μm band. The optical fiber 60 is further preferably an MFD (Mode Field Diameter) converting fiber. The MFD converting fiber may be formed by heating up a portion of the optical fiber 60. The optical axis of the fiber 60 is coincide with that of the ferrule 50 and is extending along the axis α. The ferrule 50 is preferably made of insulating material such as ceramic, and has a bore 51 along the axis α and the center thereof, into which the optical fiber 60 is to be inserted.

Figure 3:
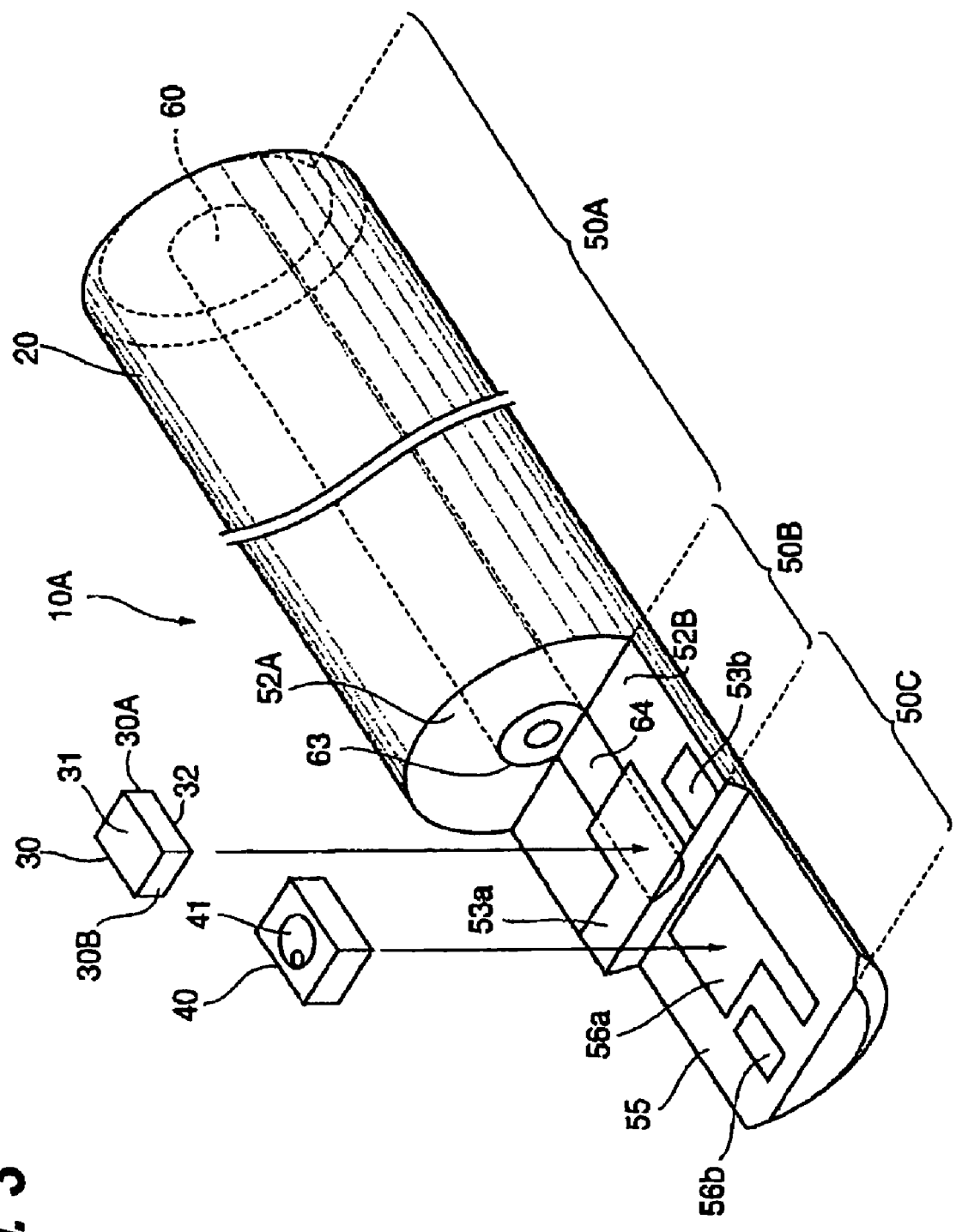
FIG. 3 is an exploded view showing the optical module of the first embodiment.
Figure 4:
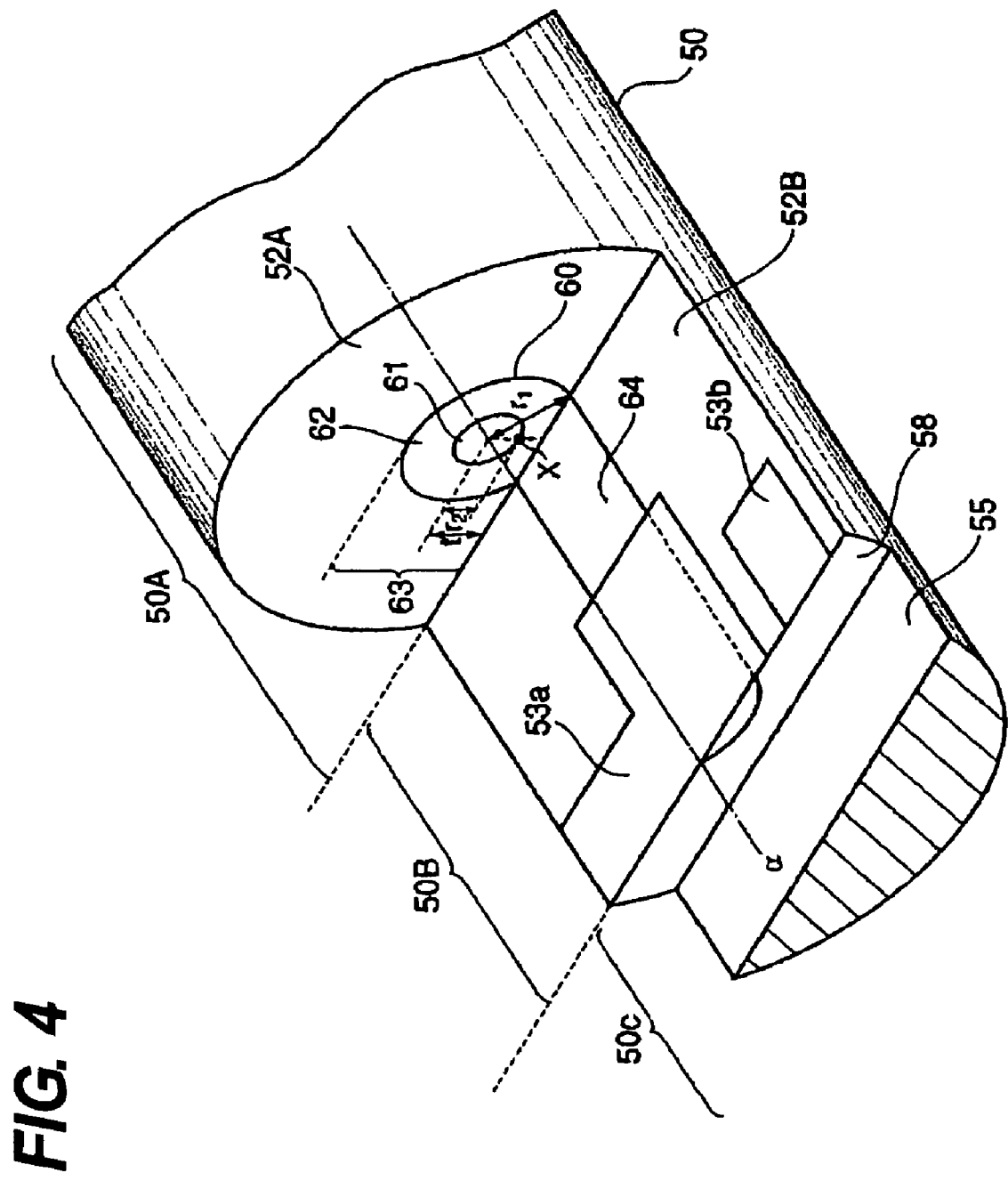
FIG. 4 is a magnified perspective view of the second region of the ferrule used in the present optical module.

FIG. 3 is an exploded view of the optical module 10A, and FIG. 4 is an expanded view of the second region 50B of the ferrule assembly 50. The first region 50A of the ferrule 50 includes an end surface 52A, while the second region 50B thereof includes a mounting surface 52B.

The end surface 52A exposes the tip 63 of the optical fiber 60. It is preferable that the MFD of the optical fiber 60 at the tip 63 is expanded. For example, the MFD at the end surface 52A for the wavelength of 1.31 μm is about 6 μm. A length between the axis α of the optical fiber 60 and the mounting surface 52B, which is denoted as t in FIG. 4, is smaller than a radius $r_1$ of the optical fiber 60. Whole core 61 is exposed at the tip 63, because the length t is greater than a radius $r_2$ of the core. Further, the first mounting surface 52B exposes a section 64 of the optical fiber 60, which is the cladding thereof. The second region 52B also provides wiring patterns 53a and 53b thereon.

The ferrule 50 is further preferable to include a third region 50C. The first, second and third regions 50A to 50C are arranged along the axis α in this order. In the third region 50C, another mounting surface 55 is provided. A step 58 is formed between the first and second mounting surfaces, 52B and 65, whereby the level of the second mounting surface 55 is lower than the first mounting surface 62B. On the second mounting surface 55 is also provided wiring patterns 56A and 56B. The light-receiving device 40 is disposed on the wiring pattern 56A to couple with the light-emitting device 30 disposed on the first mounting surface 52B.

The light-emitting device 30 is disposed on the wiring pattern 53a, and electrically connected to another wiring pattern 53b with a lead 54 to supply a bias from an external power supply, which is not shown in figures. The light-emitting device is typically a laser diode having a first facet 30A intersecting the optical axis α. A spot size, which means a radius of the field pattern of the emitted light, is about 1.6 μm at the first facet 30A thereof.

The light-emitting device 30 is optically coupled with the optical fiber 60: namely, light emitted from the first facet 30A enters the tip 63 of the optical fiber 60. It is preferable that the point of the device 30, from which the light is emitted, locates on the optical axis α of the optical fiber 60.

The light-receiving device 40 is typically a photodiode, and has a light-sensitive surface 41 opposite to the second mounting surface 55. The light-receiving device 40 is electrically connected to the wiring pattern 56b with a lead 57. A thickness h of the light-receiving device 40 is nearly equal to the step 58 between the first and second mounting surfaces 52B and 55.

Next, an assembling process of the optical module 10A will be described.

First, the optical fiber 60 is inserted into the bore of the ferrule 50. The second and third regions 50B and 50C of the ferrule 50 is processed by, for example, the machining to form the first and second mounting surfaces 52B and 65, which exposes the tip 63 of the optical fiber 60. It is preferable that the optical fiber 60 is the MFD converting fiber such that the MFD at the tip 63 is converted.

Next, wiring patterns 53a, 53b, 56a, and 56b are formed on the first and second mounting surfaces, respectively. The light-emitting device 30 and the light-receiving device 40 are mounted on the first and second mounting surfaces 52B and 55.

Figure 5:
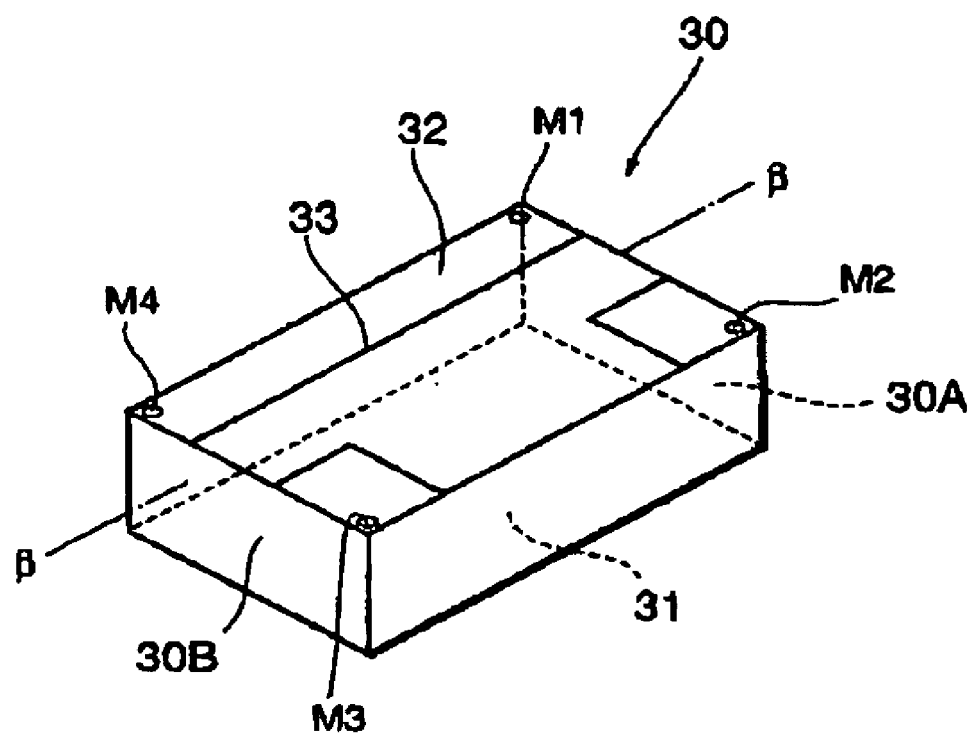
FIG. 5 shows the light-emitting device included in the present optical module.

Mounting of devices 30 and 40 on respective mounting surfaces 52B and 55 of the ferrule 50 will be described in detail. FIG. 5 is a perspective view of the light-emitting device. The light-emitting device 30 provides alignment marks M1 to M4. These alignment marks M1 to M4 may be formed at respective corners on a surface 32 simultaneously to the active layer formation, which enables to precisely align the marks M1 to M4 with the active layer of the light-emitting device 30. Subsequently to the formation of the alignment mark, an electrode 33 is formed by the plating or the evaporation on the surface 32, thereby obtaining the electrode 33 aligned with the active layer.

Figure 6:
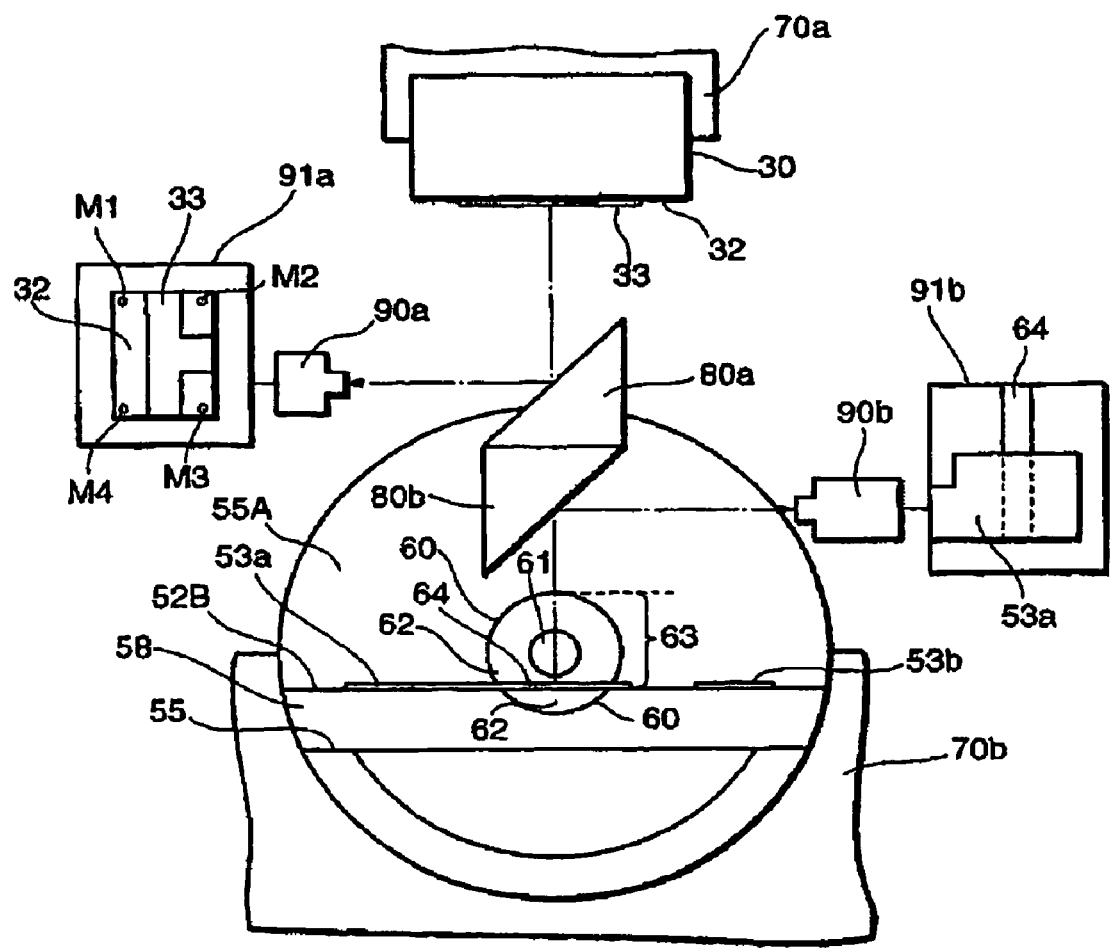
FIG. 6 shows a step for assembling the optical module.

FIG. 6 shows one assembling step of the optical module 10A. A fixture 70a secures the light-emitting device 30, while another fixture 70b secures the ferrule 50. The fixtures 70a and 70b, holding the light-emitting device 30 and the ferrule 50, may adjust a positional relationship between the light-emitting device 30 and the ferrule 50 in three dimensional.

The light-emitting device 30 is held apart from the mounting surface 52B by a predetermined space as the surface 32 thereof faces the mounting surface 52B. Between the light-emitting device 30 and the mounting surface 52B is disposed two prisms 80a and 80b, which enables to simultaneously observe the electrode 33 provided on the light-emitting device 30 with a camera 90a and the section 64 of the cladding exposed on the first mounting surface 52B with another camera 90b. The predetermined space aforementioned is enough for disposing two prisms 80a and 80b therein.

Figure 7:
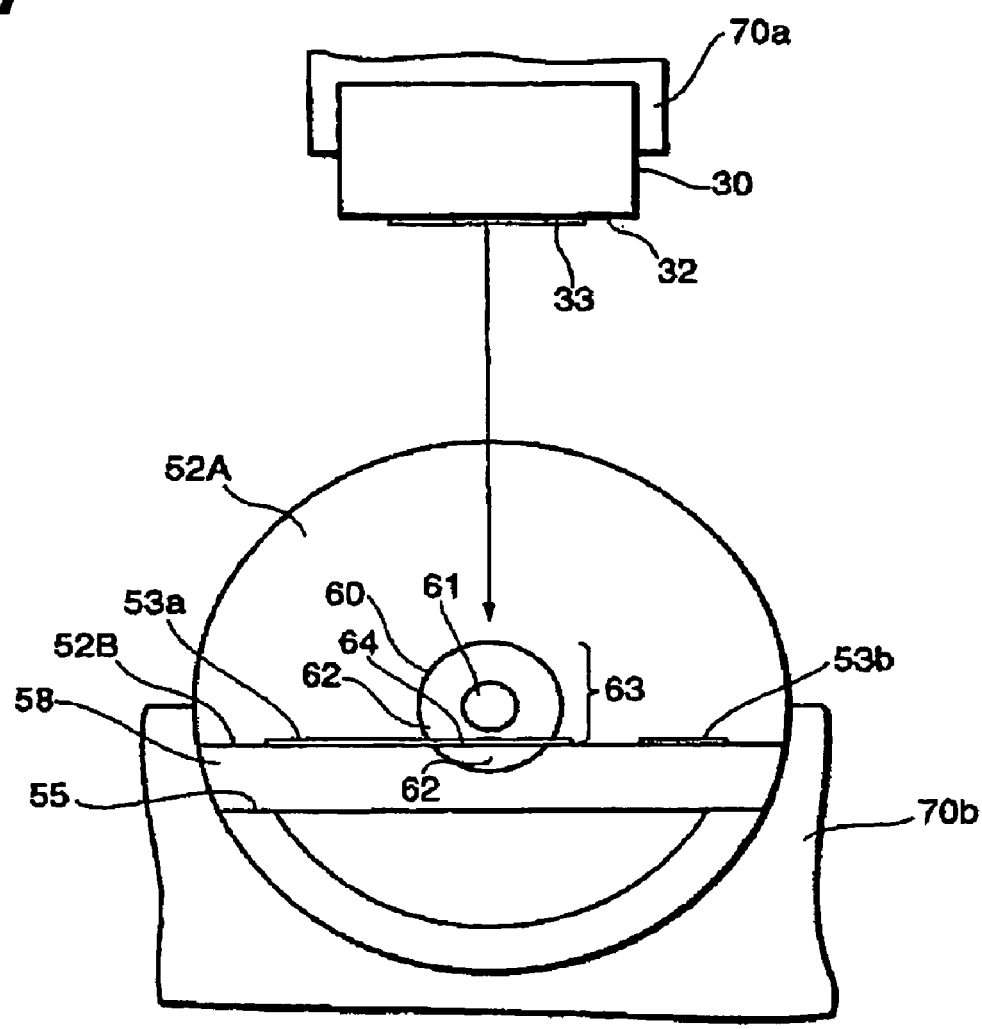
FIG. 7 shows another step, subsequent to the step shown in FIG. 6, for assembling the optical module of the present invention.

The electrode 33 is thus aligned with the section 64 of the cladding 62 of the optical fiber 60 based on images displayed on respective monitors 91a and 91b. In detail, one of the light-emitting device 30 and the ferrule 50, i.e., the optical fiber 60, is relatively moved along X and Y directions, which positions the electrode 33 against the section 64 of the cladding 62. FIG. 7 shows an assembling step next to that shown in FIG. 6. After positioning the light-emitting device 30 and the first mounting surface 52B, two prisms 80a and 80b, and two cameras 90a and 90b are took away as keeping the relative position of light-emitting device 30 and the mounting surface 52B, the light-emitting device 30 is moved down and thus mounted on the mounting surface 52B.

Subsequently, a lead 54 connects the upper surface 31 of the light-emitting device 30, which is opposite to the primary surface having alignment marks M1 to M4 thereon, to the wiring pattern 53b on the mounting surface 52B. The light-receiving device 40 is mounted on the second mounting surface 55 such that the light sensitive surface 41 turns upward, and another lead 57 connects the light-receiving device 40 to the wiring pattern 56b, thus completing the optical module 10A.

In the optical module 10A, the light-emitting device 30 emits light from both facets 30A and 30B. The facet 30A faces the tip 63 of the optical fiber 60, whereby the light emitted from the facet 30A directly enters the optical fiber 60.

Figure 8:
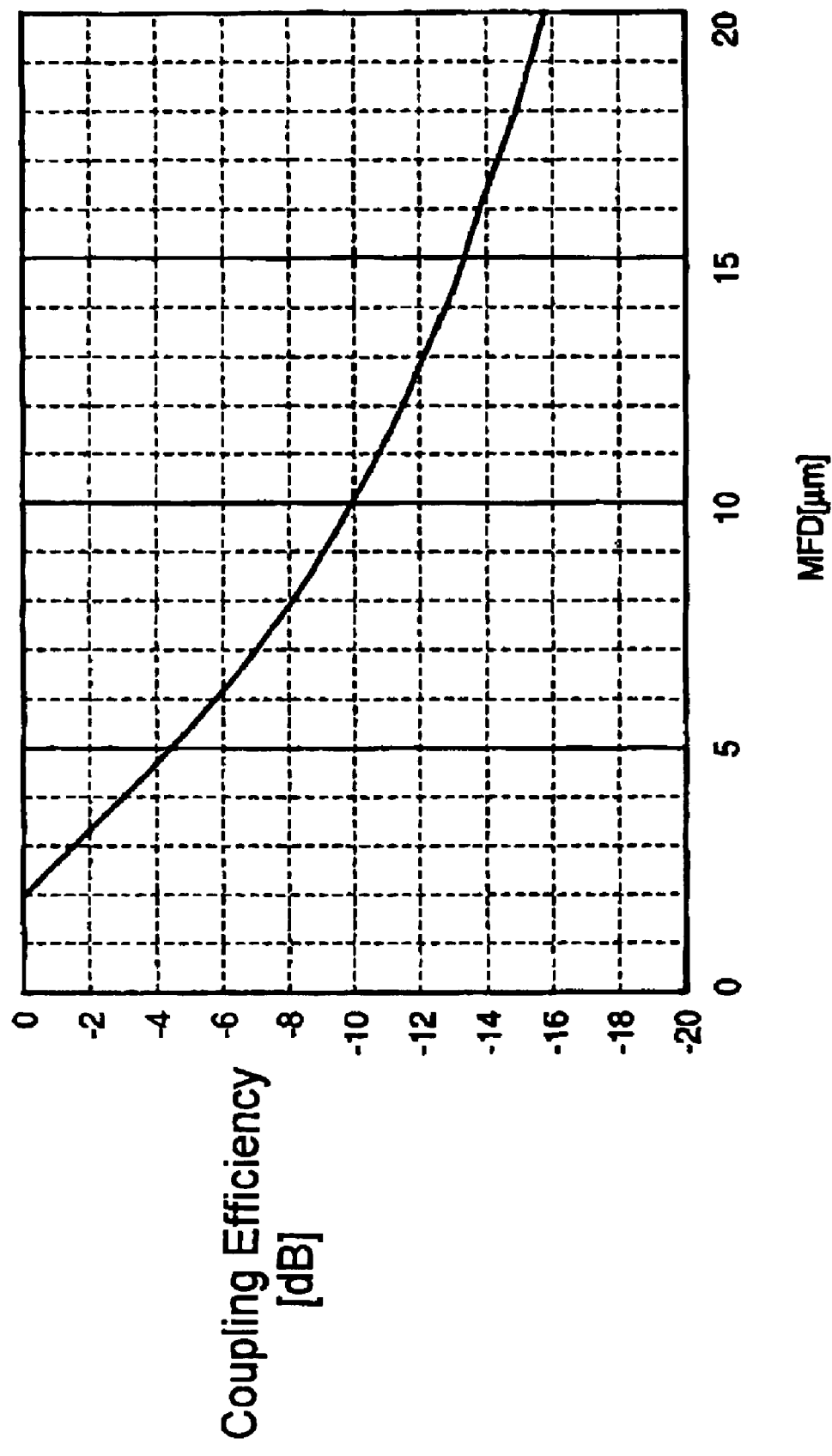
FIG. 8 shows a relation of the optical coupling efficiency between the optical fiber and the light-emitting device to the mode field diameter of the optical fiber included in the present optical module.

FIG. 8 shows a relation between the MFD of the optical fiber and the optical coupling efficiency. The horizontal axis denotes the MFD in micron meter, while the vertical axis denotes the coupling efficiency in a unit of dB. It will be understood that, as the MFD decreases and closes to the spot size of the light-emitting device 30, the optical coupling efficiency increases. Therefore, it is preferable that the optical fiber 60 is a MFD converting fiber such that the MFD at the tip 63 thereof is smaller than that of ordinal single mode fiber.

In the present optical module 10A, the light-emitting device 30 is mounted on the ferrule assembly 20. Accordingly, the optical alignment between the optical fiber 60 and the light-emitting device 30 is performed in one time, which decreases the scattering of the optical coupling efficiency therebetween compared with the passively aligned optical module using the V-groove provided on the silicon substrate because opportunity for causing the miss-alignment may be reduced.

Further, the length t between the axis α of the optical fiber 60 and the mounting surface 52B is smaller than the radius $r_2$ of the optical fiber. Accordingly, auxiliary member to optically couple the light-emitting device 30 with the optical fiber 60 is unnecessary, thereby decreasing the scattering due to the dimensional tolerance of the coupling efficiency compared with the case that such auxiliary member is used.

Still further in the present optical module, the mounting surface 52B has marks for aligning the light-emitting device 30, and this mark is a section 64 of the optical fiber 60. The position of the light-emitting device 30 relatively to the mounting surface 52B is defined by aligning marks M1 to M4 provided in the device 30 with the section 64. Accordingly, it is unnecessary to take the accuracy of the formation of the mark into consideration compared with the case that the alignment mark is independently formed. This reduces the factor for scattering the optical coupling efficiency between the device 30 and the optical fiber 60.

The light-emitting device has a stack of semiconductor layers including the active layer on the semiconductor substrate, and the total thickness of layers including the substrate thereof reaches about 100 μm. The active layer locates a few micron meters, for example 5 μm, below the top surface thereof. In other words, the active layer, which is equal to the optical axis β of the light-emitting device, is about 95 μm high from the surface thereof facing to the mounting surface 52B.

On the other hand, the diameter of the optical fiber is 125 μm, and the length t between the mounting surface 52B and the axis of the optical fiber α is smaller than the radius $r_1$, which is 62.5 μm, of the optical fiber. Therefore, by mounting the light-emitting device 30 on the mounting surface 62B such that the surface opposite to the semiconductor substrate, for example, the surface 32 in FIG. 7 and dose to the active layer formed therein, faces and is in contact with the mounting surface 52B, the light-emitting device 30 may be coupled with the optical fiber 60. This arrangement of the light-emitting device 30 is called as the epi-down arrangement.

When the epi-down arrangement is applied, the scattering of the optical coupling due to the scattering of the thickness of the semiconductor substrate, which is considered to be typically +/−10 μm, may be escaped. That is, the length between the optical axis β of the light-emitting device 30 and the mounting surface 52B does not fluctuate.

The level of the second mounting surface is lower than that of the first mounting surface. Accordingly, the light emitted from the second facet 30B of the light-emitting device 30 may be received by the light-receiving device 40 without being intercepted by the first surface 52B, which enables to perform an auto power control (APC) for the light-emitting device.

It is further preferable that the edge of the second facet 30B locates an edge of the first mounting surface 52B, which is adjacent to the second mounting surface 65 to increase the amount of light reaching the light-receiving device 40 without being cut by the first mounting surface 52B. Further, when the ferrule is made of ceramics having good thermal conductivity, heat generated by the light-emitting device 30 is dissipated in ease along the ferrule, which reduces the temperature rise and thus suppresses the fluctuation of the oscillation wavelength of the light-emitting device 30 due to the variation of the temperature.

Figure 9:
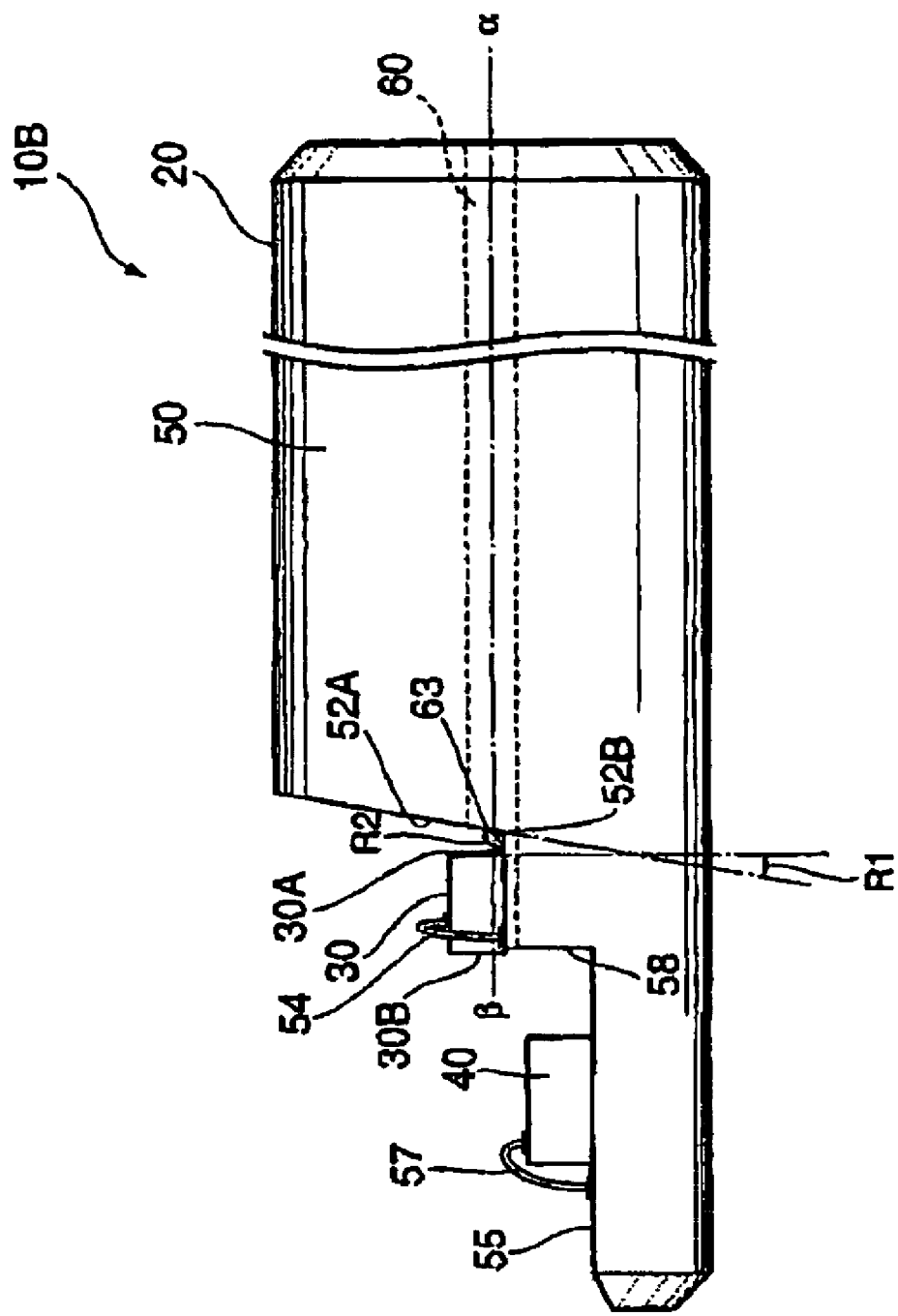
FIG. 9 shows a modification in which the end surface of the ferrule is inclined to the surface of the ferrule where the light-emitting device is mounted thereon.

The present embodiment may have various modifications, for example, the end surface 52A of the ferrule 50 may incline to the mounting surface 52B. FIG. 9 is a side view showing such modification 10B having the inclined end surface.

In the optical module 10B shown in FIG. 9, the end surface 52A has an acute angle R1 against the first facet 30A of the light-emitting device 30, while an obtuse angle R2 against the mounting surface 52B. The angle R1 may be 5° to 8°, while the angle R2 may be 95° to 98°. Since the end surface 52A is inclined to the first facet 30A of the light-emitting device, the light emitted from the first facet 30A and reflected by the end surface 52A does not return to the active layer of the light-emitting device 30. This reduces optical noise generated in the active layer due to the stray light entering therein, and enables the reliable operation of the light-emitting device, in particular, which is quite effective for the case that the light-emitting device is a type of a distributed feedback laser.

Figure 10:
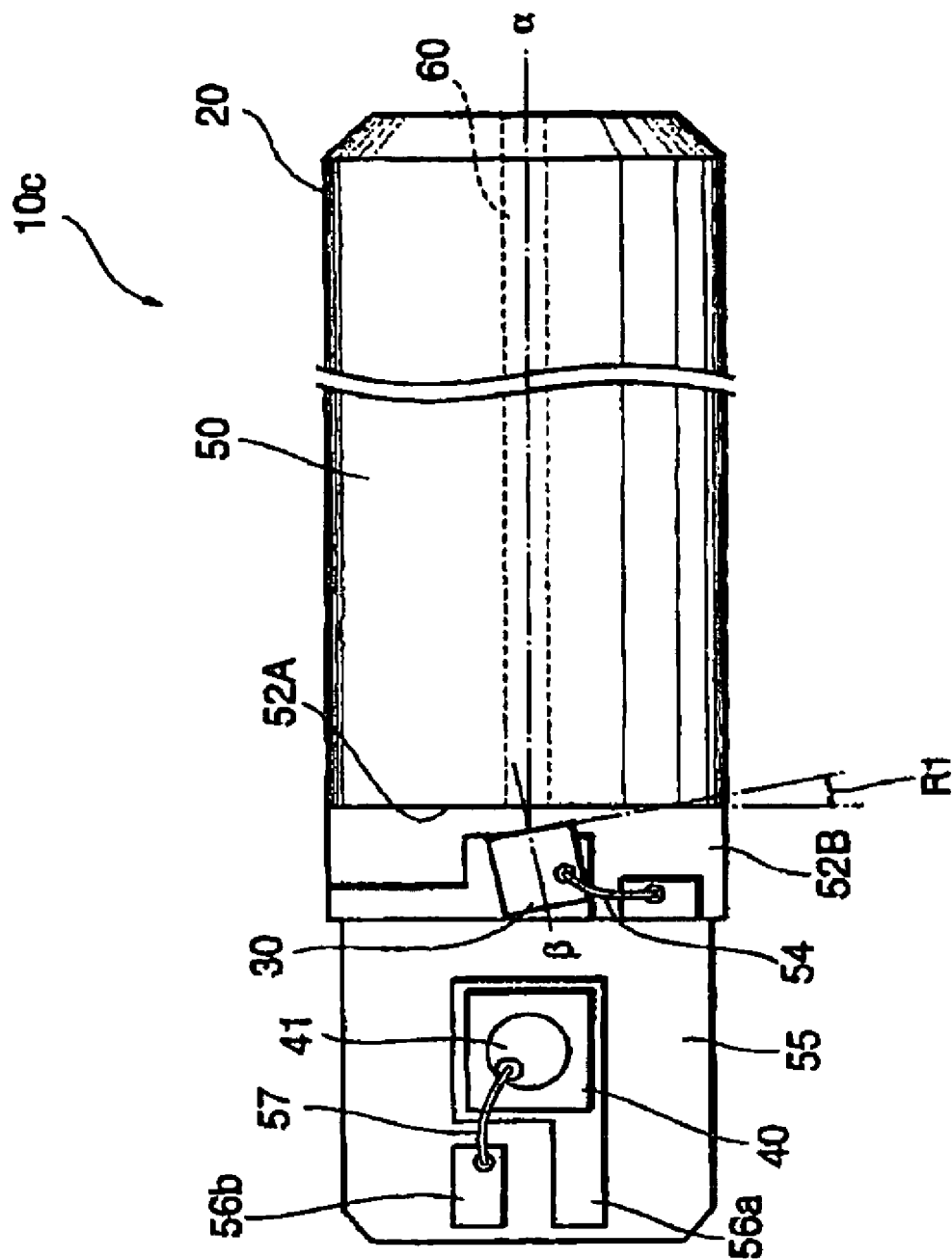
FIG. 10 shows another modification in which the facet of the light-emitting device is inclined to the end surface of the ferrule.

FIG. 10 is a plan view showing another modification 10C of the embodiment shown in FIG. 1. In this modification, the first facet 30A of the light-emitting device and the end surface 52A of the ferrule makes an angle R1, for example 5° to 8°. The end surface 52A may be inclined to the mounting surface 52B as previous modification shown in FIG. 9, or may make a right angle.

Although thus described embodiment and modifications have the light-emitting device mounted in the mounting surface 52B, a light-receiving device may be mounted on the first mounting surface 52B. In such case, the third region 50C, where the light-receiving device 40 is to be mounted, may be omitted.

Second Embodiment

Figure 11:
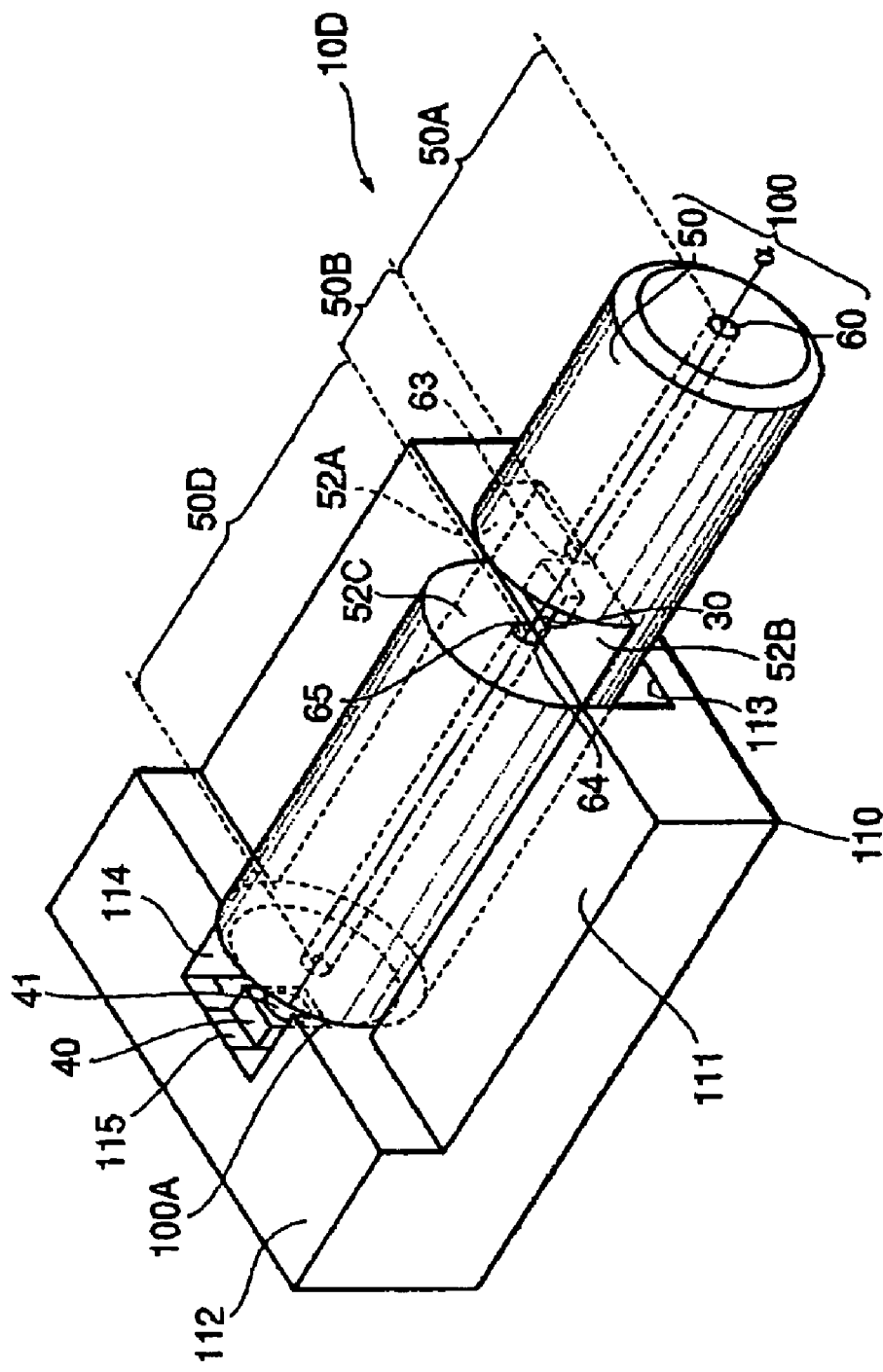
FIG. 11 is a perspective view showing the optical module according to the second embodiment of the present invention.

Next, a second embodiment of the present invention will be described in detail. FIG. 11 is a perspective view showing an optical module 10D according to the second embodiment. The optical module 10D includes an optical fiber 60, a ferrule 50, a light-emitting device 30, a light-receiving device 40, and a carrier 110 for the light-receiving device.

The ferrule 50 provides, in place of the third region 50C in the previous embodiment, a fourth region 50D that provides an optical fiber 60 similar to the first region 50A thereof. The fourth region 50D is adjacent to the second region 50B.

Figure 12:
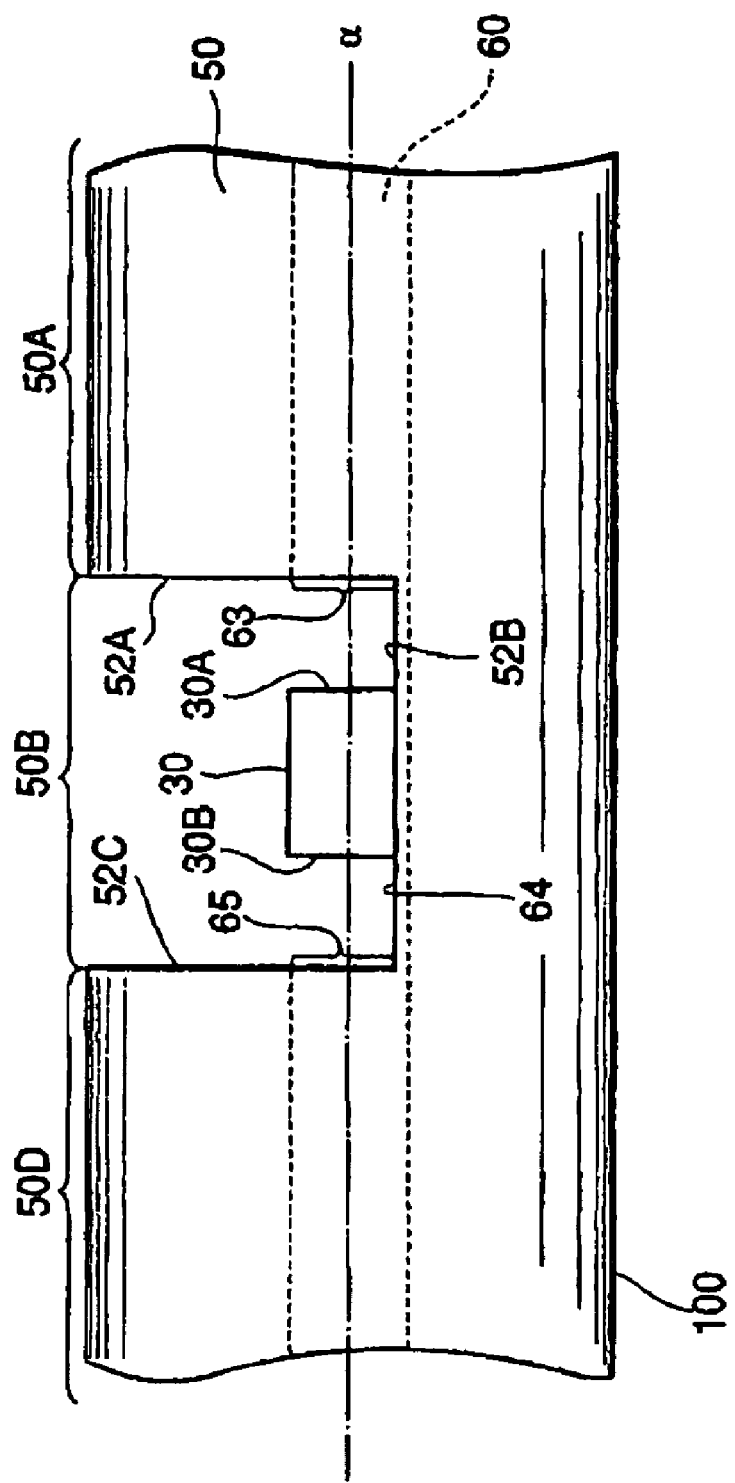
FIG. 12 is a magnified view showing the second region of the optical module shown in FIG. 11.

FIG. 12 is a side view showing the second region 50B and its adjacent regions 50A and 50D. The second region 50B includes the mounting surface 52B and the end surface 52A similar to the previous embodiment, and further includes another end surface 52C facing to the first end surface 52A. The other end surface 52C exposes the tip 65 of the optical fiber 60 that has a similar structure to the other tip 63, namely, the MFD of the optical fiber 60 may be converted at the tip 65. The first facet 30A of the light-emitting device 30 optically couples with the tip 63 same as the previous embodiment, while the second facet 30B thereof optically couples with the other tip 65.

Figure 13:
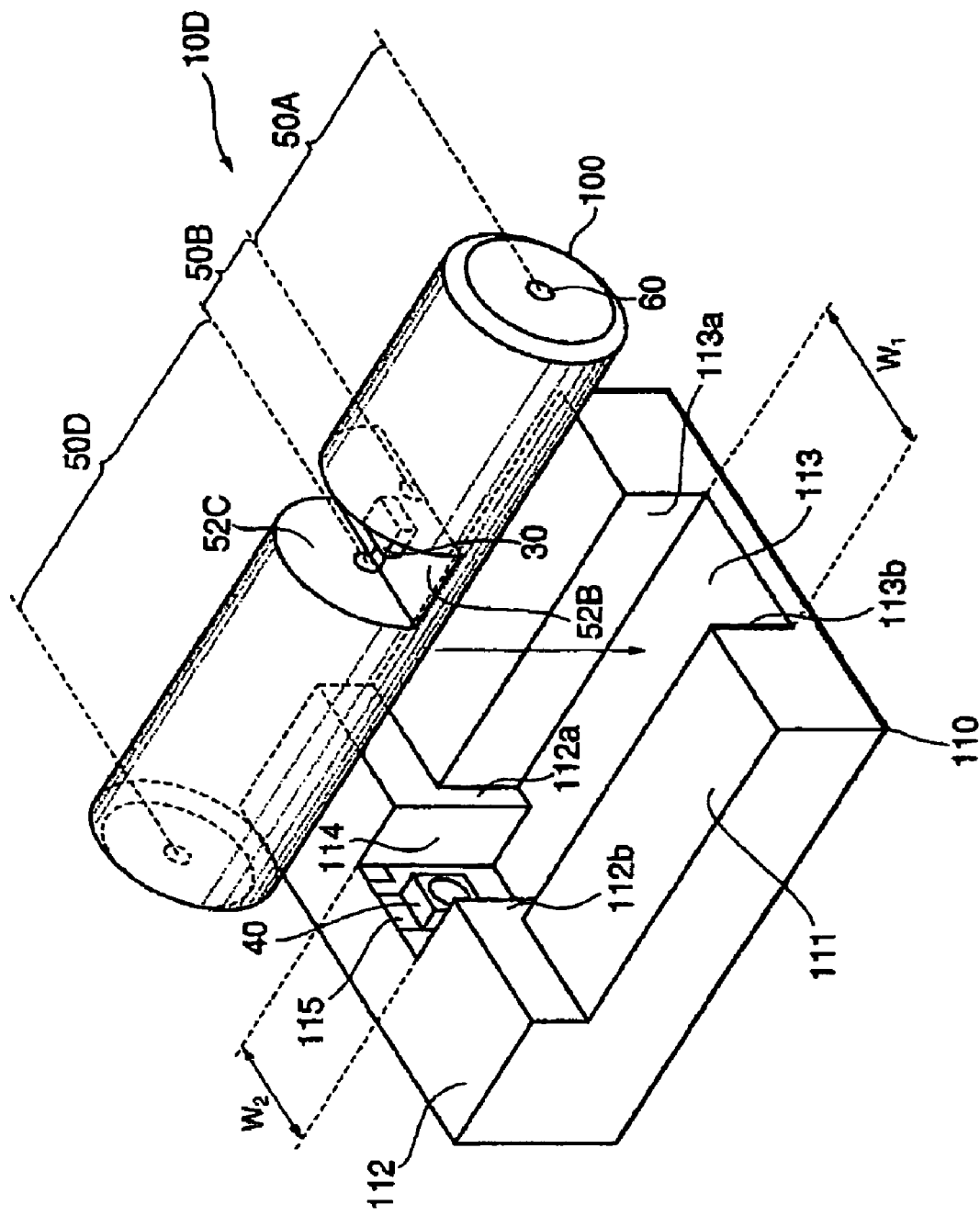
FIG. 13 is an exploded view showing the optical module of the second embodiment shown in FIG. 10.

FIG. 13 is an exploded view showing the optical module 10D. The carrier 110, having an L-shape, comprises a first and second portions 111 and 112. The first portion 111 provides a depressed portion 113 having a width $W_1$, which is nearly equal to, or slightly smaller than the diameter of the ferrule 50.

The second portion 112 of the carrier 110 has a depressed portion 114 for receiving the light-receiving device 40. The bottom 115 of the depressed portion 114 mounts the light-receiving device 40 thereon. The bottom 114 corresponds to the second mounting surface 55 in the first embodiment. The width $W_2$ of the depressed portion 114 is smaller than the first width $W_1$ of the other depressed portion 113 provided in the first region 111.

In the optical module 10D, the ferrule 50 is installed in the depressed portion 113 in the first region 111, while the light-receiving device 40 is mounted in the bottom of the other depressed portion 114 provided in the second region 112 such that the light-receiving device receives light emitted from the end surface 100A of the ferrule 50.

Since the width $W_1$ of the depressed portion 113 is equal to, or slightly smaller than the diameter of the ferrule 50, the outer surface of the ferrule 50 is in contact with side surfaces 113a and 113b of the depressed portion 113. Further, the width $W_2$ of the depressed portion 114 is smaller than the width $W_1$, the end surface 100A of the ferrule 50 is in contact with the side 112a and 112b of the second region 112, thereby aligning the ferrule assembly 100 against the carrier 110.

An operation of the optical module 10D will be described. The light emitted from the facet 30A enters the optical fiber 60 from the first tip 63 and propagates within the fiber 60. On the other hand, the light emitted from the facet 30B enters the optical fiber 60 from the tip 65, propagates within in the fiber 60, and outputs from the end 100A of the ferrule 50. The light-receiving device 40 receives the light output from the end surface 100A.

In the present configuration, since the light sensitive surface 41 of the light-receiving device 40 faces the end surface 100A, the light-receiving device may receive more light emitted from the facet 30B compared with the previous configuration.

The tips 63 and 65 may make an obtuse angle against the mounting surface 52B as shown in previous embodiment. Further, in the above explanations, the ferrule 50 is made of metal. However, the ferrule 50 is not restricted to a metal ferrule. Ceramics having a good thermal conduction may be applicable.

What is claimed is:

1. An optical module, comprising:
   a semiconductor optical device;
   an optical fiber having an optical axis, said optical fiber including a core and a cladding surrounding said core;
   a ferrule including a bore in a center thereof for receiving said optical fiber therein, said ferrule including a first region and a second region along said optical axis, said first region holds said core and said cladding of said optical fiber and having a first end surface exposing said core of said optical fiber at an interface to said second region, said second region holds a portion of said cladding of said optical fiber and exposing a section of said cladding along said optical axis,
   wherein said semiconductor optical device is mounted on said section of said cladding in said second region such that said semiconductor optical device optically couples with said core exposed in said end surface of said first region.

2. The optical module according to claim 1,
   wherein said core of said optical fiber has a single mode characteristics for wavelength band of 1.3 μm and 1.55 μm, and a mode field diameter of said core is converted at said end surface.

3. The optical module according to claim 1, wherein said mode field diameter of said core at said first end surface is about 6 μm.

4. The optical module according to claim 1,
   wherein said end surface makes an obtuse angle to said section of said cladding appeared in said second region.

5. The optical module according to claim 4, wherein said end surface of said first region makes an angle from 95° to 98° to said section of said cladding appeared in said second region.

6. The optical module according to claim 1, wherein said semiconductor optical device has a facet facing said end surface of said first region, and wherein said facet makes an acute angle to said first end surface.

7. The optical module according to claim 6, wherein said first facet makes an angle from 5° to 8° to said first end surface.

8. The optical module according to claim 1, wherein said optical semiconductor device is a laser diode providing a first facet and a second facet, and said ferrule further provides a third region so as to sandwich said second region with said first region, said third region providing a mounting surface by removing a portion of said ferrule, said core and said cladding to form a step between said second region, and
wherein said module further includes a photodiode mounted on said mounting surface of said third region, said first facet of said laser diode optically couples with said core exposed in said end surface of said first region and said second facet of said laser diode optically couples with said photodiode.

9. The light transmitting assembly according to claim 8, wherein said photodiode has thickness thinner than said step formed between said second and third regions.

10. The light transmitting assembly according to claim 8, wherein said laser diode is mounted on an edge of said section of said cladding adjacent to said third region.

11. The light transmitting assembly according to claim 1, wherein said ferrule is made of ceramic.

12. An optical transmitting module, comprising:
a laser diode having first and second facets for emitting light;
a photodiode for receiving said light emitted from said laser diode;
an optical fiber having a core and a cladding surrounding said core;
a ferrule having a bore for receiving said optical fiber, said ferrule including first to third regions formed such that said first region holds said optical fiber in said bore and provides a first end surface at an interface to said second region to expose a tip of said core of said optical fiber, said third region holds said optical fiber in said bore and provides a second end surface at an interface to said second region to expose another tip of said core of said optical fiber, said second end surface facing said first end surface and said second region holds said optical fiber to expose a mounting surface of said cladding of said optical fiber; and
a carrier for mounting said ferrule and said photodiode thereon,
wherein said laser diode is mounted on said mounting surface exposed in said second region such that said first facet optically couples with said core of said optical fiber exposed in said tip at said first end surface and said second facet optically couples with said core of said optical fiber exposed in the other tip of said optical fiber.

13. The optical transmitting module according to claim 12, wherein said carrier is an L-shaped carrier having first and second portions, said first portion providing a first depression for holding said ferrule, said first depression having a width substantially equal to, or slightly smaller than, an outer diameter of said ferrule, and said second portion including second depression continuous to said first depression, said second depression having a width narrower than said width of said first depression.

14. The optical transmitting module according to claim 12, wherein said photodiode is mounted on a bottom of said second depression such that a light sensitive surface of said photodiode faces an end surface of said optical fiber opposing said second end surface provided in said third region of said ferrule.

15. The optical transmitting module according to claim 12, wherein said ferrule is made of ceramic.

* * * * *